United States Patent Office 3,038,903
Patented June 12, 1962

3,038,903
OXIDES OF DIAZABICYCLO-OCTANE
Adalbert Farkas, Media, Pa., and Elbert C. Herrick, Wilmington, Del., assignors to Air Products and Chemicals, Inc., a corporation of Delaware
No Drawing. Filed Apr. 24, 1959, Ser. No. 808,576
5 Claims. (Cl. 260—268)

The present invention relates to mono- and dioxides of 1,4-diazabicyclo-2,2,2-octane as new compositions of matter and methods for preparation of the same.

The starting material, 1,4-diazabicyclo-2,2,2-octane, also known as triethylene-diamine, is described in the literature. More recently it has become available in commercial quantities, prepared by methods described in U.S. application Serial No. 628,723, filed December 17, 1956, now Patent No. 2,931,176. According to an example therein described, the aforesaid compound is obtained in acceptable yields by vapor phase cyclization of aliphatic amines, for example, diethylene triamine, over acidic silica-alumina catalyst, at a temperature of about 675° F., and separation of the desired reaction product from accompanying piperazine compounds formed and from other minor reaction by-products.

The novel compounds of the present invention correspond respectively to the formula:

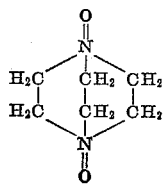

and

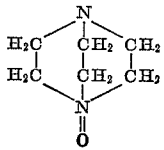

The monoxide has been prepared in essentially quantitative yields by mild oxidation of diazabicyclo-octane at room temperature with about an equimolar proportion of hydrogen peroxide. By employing 2 mols or a slight excess above 2 mols of the oxidizing agent per mol of diazabicyclo-octane, or by further oxidation of the monoxide, the dioxide is obtained.

EXAMPLE I

To about ½ part by weight of diazabicyclo-octane dissolved in 3 parts water there was added a substantially equal volume of 30% hydrogen peroxide, and the mixture permitted to stand overnight. The product had crystallized to a white solid. A attempt was made to dissolve the white solid in benzene on a steam bath which proved unsuccessful. Similarly, the white solid could not be dissolved by heating in acetone to its boiling point. The solid did dissolve readily in water. Analysis showed the solid to conform substantially to the formula weight for the monoxide of diazabicyclo-octane.

| $C_6H_{12}N_2O$ | Theory | Found |
|---|---|---|
| Carbon | 56.2 | 54.8 |
| Hydrogen | 9.4 | 9.2 |
| Nitrogen | 21.9 | 21.7 |
| Oxygen | 12.5 | |
| | 100.0 | |

EXAMPLE II

Another batch of product was prepared similarly to that of Example I above using approximately mol for mol quantities of diazabicyclo-octane and hydrogen peroxide (with peroxide in slight excess). The diazabicyclo-octane was used as an aqueous solution of 5 mols/liter and the peroxide was employed as a 30% solution.

On admixture of the two solutions an exothermic reaction was evident and the mixture became quite warm. About another ¼ volume of water was added and the diluted mixture permitted to stand overnight.

The product did not crystallize but appeared as a viscous, clear liquid, which was further evaporated by heating on a steam bath with a jet of air directed at the product. Acetone was then added (product not dissolved) and the slurry further heated on the steam bath for one hour. On cooling, the material solidified to an acetone-insoluble mass, which on drying formed a white hygroscopic powder.

A portion of the product was further dried under vacuum while being heated on a water bath. Samples of the cooled product were analyzed.

| | Found (avg. analysis) wt. percent | Calculated for $C_6H_{12}N_2O$ wt. percent |
|---|---|---|
| H | 9.0 | 9.4 |
| C | 55.5 | 56.2 |
| N | 20.0 | 21.9 |
| O (by balance) | 15.5 | 12.5 |
| | 100.0 | 100.0 |

The above analysis gave a slightly high value for oxygen, indicating that either some water or a small amount of the dioxide compound was probably present in addition to the monoxide.

EXAMPLE III

To a solution of diazabicyclo-octane (99% pure) in water (4 mols per liter), there was added a solution of 30% hydrogen peroxide in an amount furnishing 238 parts by weight of the peroxide solution (5% excess of molar) for 224 parts by weight of the diazabicyclo-octane. The exothermic reaction caused the temperature to rise to 48° C. External heat was applied and the temperature brought thereby to 102° C., which temperature was held for 5 minutes. The water was distilled off under vacuum (2 mm. Hg) in a still provided with a Dry Ice trap and the residue dried under vacuum (1.5–2 mm. Hg) with infrared heating. The white residue thus obtained was 210 parts by weight. An additional 40 parts were collected as a solid on the walls of the Dry Ice trap.

The product on analysis gave the following values compared with theoretical calculations.

| | Calc. for $C_6H_{12}N_2O$, Percent by weight | Found, Percent by weight |
|---|---|---|
| C | 56.2 | 55.38 |
| H | 9.4 | 9.57 |
| N | 21.9 | 19.13 |

EXAMPLE IV

To each mol of diazabicyclo-octane there was added 4 mols of the diazabicyclo-octane monoxide obtained from runs carried out in accordance with Examples II and III above. To 23.1 parts by weight of the above mixture there was added 50 parts water and an excess of 30% hydrogen peroxide solution run in, furnishing 68 grams of $H_2O_2$ per amino N. During the peroxide addition bubbles of gas were evolved and the temperature of the mixture rose to about 50° C. After all of the peroxide had been added, the mixture was permitted to stand at ambient temperature over the weekend, at which time the hydrogen ion concentration of the solution was tested (with test paper) and found to be about 6 (believed indicative of incomplete oxidation).

Excess hydrogen peroxide was removed by placing platinum-alumina catalyst pellets into the solution for a 2-hour period with occasional stirring. About 10 parts by weight of gas were thus evolved. The solution was again tested for excess of hydrogen peroxide by addition of potassium bichromate (Schumb et al.: Hydrogen Peroxide, Reinhold Publishing Corp., New York, 155, p. 549); no excess peroxide was evident.

The product was dehydrated under vacuum at a temperature of up to 35° C., and the solids recovered under nitrogen, weighed. Because the recovered weight indicated the presence of water, the product was again dried under vacuum at temperatures up to 53° C. The recovered dried product when weighed now approximated theoretical yield for diazabicyclo-octane-N,N'-dioxide. The recovered solid product was soluble in ethanol, but insoluble in ether, benzene and pentane.

$C_6H_{12}N_2O_2 = 19.5\%$ nitrogen
Found $= 16.1\%$ nitrogen

Nitrogen analysis being about 15% low as compared with theoretical, it was assumed that the product still contained water. It was then further dried and infrared heated under vacuum and the nitrogen analysis then again made, this time agreeing well with the theoretical N content for the dioxide.

| $C_6H_{12}N_2O_2$ | Theory, Percent | Found, Percent |
|---|---|---|
| C | 50.0 | 49.4 |
| H | 8.3 | 9.6 |
| N | 19.5 | 19.1 |
| O | 22.2 | 21.9 |
| | 100.0 | 100.0 |

Diazabicyclo-octane monoxide and dioxide are useful as polymerization inhibitors or stabilizers for unsaturated organic compounds. For example, in stabilizing styrene monomer in storage there may be added 0.01 to 0.1% of the mono- or dioxide of diazabicyclo-octane without interfering with most uses to which the styrene is to be put.

The diazabicyclo-octane-N,N'-dioxide has been tested (at the U.S. Air Force Laboratory, Chicago) as a protective agent against radiation injury by X-rays. Administered to experimental mice, it was found to be quite nontoxic, showing no significant lethal effect in doses of up to 1000 mgm./kgm. of animal body weight. Very few of the large number of compounds screened for use as protective agents against radiation exposure were of this low toxicity. From data supplied by the U.S.A.F. Laboratory on the N,N'-dioxide, a direct comparison with a control shows a definite and valuable improvement in the percentage of survivals among mice shortly after and for an intermediate time after X-irradiation at a fatal level (800 r.):

*Percentage of Survivals After X-Irradiation*

[800 r. whole body irradiation]

| Days after irradiation | 1 | 6 | 8 |
|---|---|---|---|
| Percentage survival—1—control | 100 | 60 | 50 |
| DABCO-N, N-dioxide: | | | |
| 2—500 mgm./kgm. wt | 100 | 90 | 80 |
| 3—1,000 mgm./kgm. wt | 100 | 100 | 100 |

At least two groups of ten mice each were used in each experiment, preselected for their healthy condition on the basis of several weeks' observation of weight and other characteristics prior to use. The test at the 1000 mgm./kgm. dosage showed 100% survival of the injected mice for eight days after exposure as compared to 50% survival of the non-treated controls. The product thus has a demonstrated use in the prevention or postponement of death from severe irradiation. Enhanced effects are expected at higher dosage levels. These results were deemed of important interest as compared with a large number of compounds also thus tested in the screening experiments including a number of quinone derivatives, nitriles, thiocarbamates, etc., many of which were toxic in doses as low as 25–50 mgm./kgm.

Obviously many modifications and variations of the present invention as hereinbefore set forth may be made without departing from the spirit and scope thereof and therefore only such limitations should be imposed as are indicated in the appended claims.

What is claimed is:

1. The method of preparing mono- and di-N-oxides of diazabicyclo-octane which comprises mildly oxidizing diazabicyclo-octane in aqueous medium with hydrogen peroxide at conditions including a temperature in the range of room temperature to 105° C. and a time period of at least five minutes.

2. The method according to claim 1 wherein said hydrogen peroxide is employed in equimolar amount with said diazabicyclo-octane and the product is chiefly the mono-N-oxide of diazabicyclo-octane.

3. The method according to claim 1 wherein said hydrogen peroxide is employed in a ratio of at least 2 mols per mol of said diazabicyclo-octane and the product is chiefly the di-N-oxide of diazabicyclo-octane.

4. As a new composition of matter the compound corresponding to the formula:

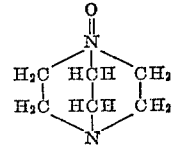

5. As a new composition of matter the oxidation product of diazabicyclo-octane corresponding to the formula:

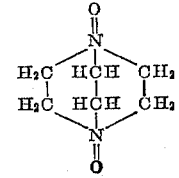

References Cited in the file of this patent

Farkas et al.: Industrial and Engineering Chemistry, vol. 51, pages 1299–1300 (1959).